United States Patent [19]

Werjefelt

[11] 4,437,318

[45] Mar. 20, 1984

[54] ENVIRONMENTAL CONTROL SYSTEM AND METHOD

[76] Inventor: Bertil R. L. Werjefelt, 277 Kaha St., Kailua, Hi. 96734

[21] Appl. No.: 73,612

[22] Filed: Sep. 10, 1979

[51] Int. Cl.³ .............................................. F25D 17/06
[52] U.S. Cl. ......................................... 62/93; 62/272; 98/1.5; 244/1 R
[58] Field of Search .................... 62/89, 90, 91, 92, 93, 62/94, 272; 98/1.5; 244/1 R

[56] References Cited

U.S. PATENT DOCUMENTS

| | | | |
|---|---|---|---|
| 1,863,576 | 6/1932 | Morse et al. | 62/93 |
| 1,866,346 | 7/1932 | Clark | 62/93 |
| 2,017,027 | 10/1935 | Forrest | 62/92 |
| 2,479,766 | 8/1949 | Mulvaney | 244/1 R |
| 2,485,522 | 10/1949 | Anderson | 62/150 |
| 2,496,862 | 2/1950 | Del Mar | 98/1.5 |
| 2,835,340 | 5/1958 | McGuff et al. | 62/93 |
| 3,042,383 | 7/1960 | Pennington | 62/91 |
| 4,018,060 | 4/1977 | Kinsell et al. | 62/91 |

OTHER PUBLICATIONS

Article by William M. Carley in Wall Street Journal, May 5, 1977.
Advisory Circular AC HO:0052, Jul. 21, 1977.
Information Bulletin by Flying Tiger Airlines Flt. Ops., Feb. 11, 1981, entitled: Ozone Awareness Bulletin.

Primary Examiner—Ronald C. Capossela
Attorney, Agent, or Firm—Sandler & Greenblum

[57] ABSTRACT

Method for controlling humidity levels of internal ambient air for aircraft, utilizing air water separation devices for dehumidification strategically located so as to dehumidify ambient air prior to exhausting the air overboard from the aircraft. At least a portion of the water so recovered is utilized in fluid or vapor form to maintain desired humidity levels on the aircraft.

12 Claims, 2 Drawing Figures

ENVIRONMENTAL CONTROL SYSTEM AND METHOD

BACKGROUND OF THE INVENTION

1. Field of the Invention

This invention relates to internal climate control for aircraft.

2. Description of Prior Art

The prior art relating to internal aircraft conditions, and the control thereof, is well documented in aviation medical journals, aviation engineering journals, government aviation regulations and popular aviation magazines. One publication of particular interest addressing the basic principles and the existing prior art in the field is "Fundamentals of Aircraft Environmental Control" by Alvin Ebeling (1968) Hayden Book Co., Inc. New York. The forgoing literature is readily available and the material disclosed is incorporated herein by reference.

One principal problem pertaining to aircraft climate control, especially on recent aircraft designs, is the loss of moisture inside the aircraft during flight. Prior to the advent of commercial jet aviation, the problem of retaining moisture on aircraft was less pronounced than it is today. The principal method of maintaining acceptable moisture levels was by means of a boiler system, whereby water is evaporated into the internal ambient air. Excess water is carried on board for this specific purpose. This has proved only marginally effective. Another system presently in use sprays a very fine water mist at ambient temperatures into the cockpit and cabin area, the water source being the limited on-board supply of potable water.

While the aircraft itself may carry sufficient water to humidify the cabin air through the entire voyage, such a procedure would necessarily entail loading large amounts of water onto the aircraft, thus adding substantially to its weight. The additional weight of the aircraft quite obviously increases its fuel consumption and reduces available commercial space on said aircraft.

On the jet propelled commercial passenger aircraft of today, flight durations range from less than one and up to fourteen hours primarily at flight levels from 18,000 feet to 40,000 feet, and in some instances, as high as 50,000 feet. The maximum possible moisture content in the ambient air at these altitudes is less than 1/20th that of ambient air of sea level.

On an average wide body aircraft today the entire air supply is exchanged approximately every three minutes. Among other methods, this involves the extraction of air from the engine area, heating it and, in most cases, cooling it prior to entering it into the internal structure of the aircraft, while simultaneously exhausting an appropriate supply, thus maintaining desired pressure and temperature.

Owing to the arid nature of this air, internal moisture is rapidly depleted. As countless millions of passengers, thousands of flight attendants and flight deck personnel are aware, this is a frequently troublesome situation. The lack of resolution to this troublesome situation is apparent in the continued discomfort still experienced by these people at the time of this writing. Not only does it, at the time, cause considerable inconvenience through irritation of the mucous membranes but it also affects the skin and, in addition, aggravates certain existing medical or health problems. In addition, owing to the temporary, in some cases prolonged, dehydration and incapacitation of mucous membranes and other tissues and follicles, it occasionally renders the people subjected to a host of harmful bacteria which they, under normal conditions, would have adequate defense mechanisms for, but under these circumstances, these defenses are severely impaired. It is ironic that all these problems and discomforts which have plagued millions of people for many years should have a simple solution.

It is thus a principal object of the invention to provide desirable moisture content to the air in the internal structure of the aircraft.

There appears to be several reasons for the current substandard climate conditions on high performance commercial jet aircraft. Adequate solutions may have eluded laymen as well as experts, because it is not obvious that when one encounters the arid climate condition on the aircraft, one would associate this with the use of a dehumidification system.

It has, therefore, been left up to the persons on board to provide part of the moisture content by means of natural evaporation from the body, and, in addition, certain materials and fixtures on board the aircraft to maintain moisture in the aircraft for a certain time, thus to a small measure, reducing the problem.

SUMMARY OF THE INVENTION

It is, therefore, an object of the invention to overcome the above problems.

The solution to the problem which is the object of this invention, is to retain the original desired moisture content in the aircraft by providing a dehumidification system or water separator device, in such a position on board the aircraft, that it would separate most, if not all, of the water from the air prior to allowing the air to exhaust from the aircraft. In turn, of course, a humidification, and perhaps purification system may have to be provided to reintroduce the moisture into the aircraft on a continuous, sufficient and acceptable basis. Various practical solutions based on the explanations and descriptions herein are possible. Any of a multitude of systems can be used. One preferred system which reduces the weight of on-board equipment and provides an energy efficient means for conversion utilizes one or more water separators such as are already in use to remove moisture from the engine bleed air on high performance commerical jet aircraft, prior to entering said air for distribution into the internal structure of the aircraft. In so doing, one may "close off" any suitable flow areas for the internal air, for instance, around the butterfly or thrust recovery valves or, if air is allowed to circulate upward or downward from the cabin floor, then "close off" this area. Thus, by allowing the air passage through appropriately placed water separators, one can retain the water on board and exhaust the dry air over-board. In connection herewith it may be of assistance to allow the ambient air on board the aircraft to enter a pre-cooling chamber prior to entering the water separator. The pre-cooling chamber is intended to bring the temperatures of the moist air to, or below, the dew point thereby facilitating separation. For cooling purposes, the external ambient low temperature air, at high altitudes, can be used. It would seem most appropriate to bleed some of the cooling ram air, which is available in most aircraft, and duct it to the pre-cooling chamber.

Another method for dehumidifying the air prior to allowing it to exhaust over-board can simply be described as utilizing a "water vacuum cleaner", the principles of its function are well known in a household varity vacuum cleaner called RAINBOW REX-AIR. The concept entails lowering the temperature of the water in the "water vacuum cleaner" to, or below, the dew point and maintaining it at that level. Again, this can be accomplished by utilizing the external cold ambient air. The "water vacuum cleaner" would have to be provided in this case with appropriate methods for removing excess water in its container. Conversely, of course, by raising the water temperature in the "water vacuum cleaner" one can also permit removal of excess moisture over-board.

Bleed air from the engines can be used for the purposes of evaporation. However, it would appear more simple to redistribute the captured water under pressure at ambient temperatures through fine spray of diffusion nozzles. This method of evaporation is practiced on some aircraft today.

In its broadest terms the system of the invention comprises removal means for at least partially removing moisture from an air mass and replacement means for at least partially replacing the air mass with fresh air. Humidification means are additionally provided for humidifying the fresh air by adding at least a portion of the removed moisture to the fresh air.

In a particularly preferred embodiment of the invention the humidification system is used in combination with an aircraft for purposes of of humidifying the interior of the aircraft.

The removal means may comprise condensation means for condensing the removed moisture.

The condensation means may comprise an air intake for drawing in cold ambient air and for cooling the air mass prior to removal of the air mass so as to at least partially condense mositure out of the air mass.

The removal means of the system may comprise a silica gel or molecular sieve or, for that matter, an electrically operated refrigeration system.

The evaporation means may preferably comprise means for contacting heated exhaust air from the engines of the aircraft with removed moisture for purposes of re-evaporating the removed moisture.

For sanitary purposes the system may further comprise purification mean for purifying the removed moisture.

The invention further relates to a method for humidifying the interior of an aircraft comprising the steps of removing air from the interior of the aircraft and removing moisture from the removed air. The method further comprises replacing the removed air with fresh air and adding at least a portion of the removed moisture to the fresh air to humidfy the fresh air.

The method further comprises purifying the removed moisture prior to adding it to the fresh air.

Obviously there are many different types, sizes and designs of aircraft, each one with its own peculiarities. However, basically and in principle, they are alike in that they must be provided with a continual change of internal air. Flow patterns, pressure control valves, heating and cooling systems are of a wide variety. Likewise there are a multitude of methods for separating water droplets or vapor from air. Therefore, any known suitable systems, whether they be of a mechanical or chemical nature may be used.

BRIEF DESCRIPTION OF THE DRAWINGS

With reference to the annexed drawings.

DESCRIPTION OF PREFERRED EMBODIMENTS

Figure 1:
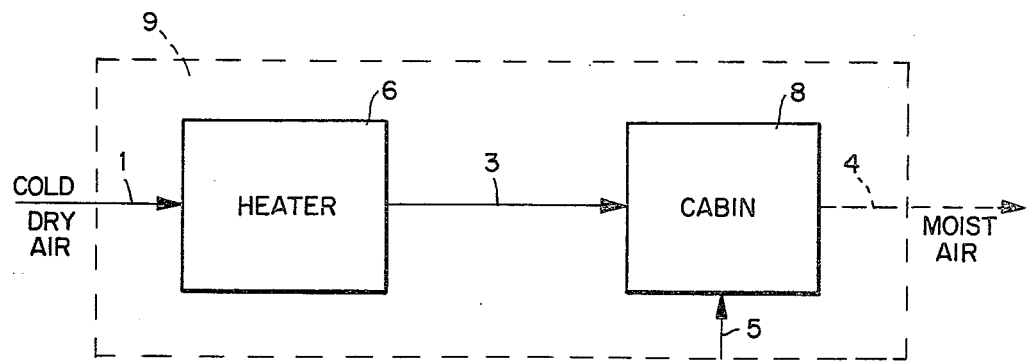
FIG. 1 is a schematic diagram illustrating the PRIOR ART.

Thus, FIG. 1 describes the current state of the art where cold dry air 1 is allowed entry into a part of the aircraft structure 9. The said cold dry air 1 is heated at 6 becoming warm dry air 3 and is then allowed entry into the passenger cargo compartment 8 where it mixes with retained moisture or vapor 5 and becomes warm moist air 4, subsequently leaving the internal passenger cargo compartment 8 and the aircraft 9 per se as warm moist air 4.

In a similar prior art embodiment (not shown) water is brought on board the aircraft for the specific purpose of prolonging the retention of moisture on board the aircraft. Thus, in this embodiment, cold dry air 1 is allowed to enter the aircraft 9 per se and is heated at 6. As explained earlier this most commonly occurs around the engine area. The air becomes warm dry air 3 and is allowed entry into the passenger cargo compartment 8 where it encounters water vapor 5 and becomes moist warm air 4. An additional heat source such as a boiler (not shown) is used to vaporize the liquid so as to produce warm moist air 4. As was previously the case, the warm moist air 4 is exhausted from the internal passenger cargo compartment 8 and out of the aircraft 9 per se as warm moist air 4 while fresh dry air admitted to the cabin must constantly be humidified with the limited available supply of water.

Because of relatively limited water supplies, the procedures described in the two previous embodiments lead to the problem of too much arid air in the passenger cargo compartment which is the state of the art today.

Figure 2:
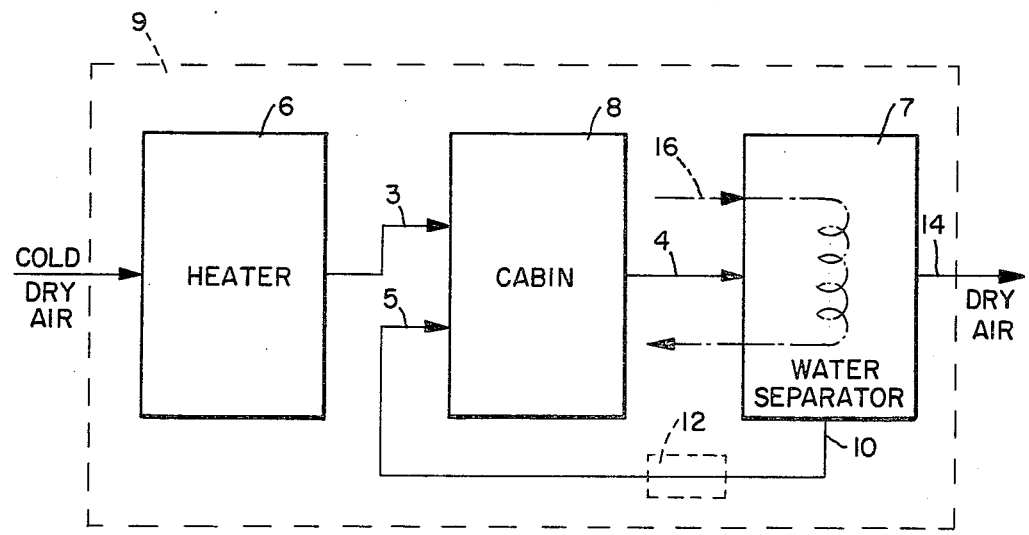
FIG. 2 is a schematic diagram illustrating the inventive system.

FIG. 2 denotes one preferred embodiment of the invention wherein cold dry air 1 is allowed to enter the aircraft 9 and is then heated at 6 becoming warm dry air 3 prior to entering into the passenger cargo compartment 8 where it mixes with the water vapor 5 becoming warm moist air 4. Prior to being exhausted from this compartment at least a portion of the warm moist air 4, as is noted in FIG. 2, is passed through a moisture separator such as a cooling source 7 whereby separation, condensation or crystalization or moisture occurs. At least a portion of the water is recirculated through line 10 to an optional heating source 12 which vaporizes the condensed moisture. In the process, dry air 14 is exhausted from the passenger cargo compartment and from the aircraft 9. Although the dehumidification and humidification cycle preferably occurs within the passenger cargo compartment 8, it is of course, obvious that dehumidification can occur in any suitable location within the aircraft 9 with the ultimate intention of providing the desired moisture content in the passenger cargo compartment 8.

Dashed lines 16 schematically represent the use of an air intake for drawing in cold ambient air to cool the air leaving the cabin prior to exhaustion of the air for purposes of at least partially condensing moisture out of the air mass.

As noted previously, an electrical refrigeration system could also be used.

As an additional advantage of the invention, it has been unexpectedly found that increased levels of moisture in the aircraft cabin serve to offset some of the problems encountered as a result of ozone being present in the air breathed by the passengers and crew. Although Applicant is not certain as to the exact fashion in which the moisture counteracts the ozone, this is nevertheless a significant feature of the invention in that ozone contamination may prove to be a very serious problem.

Although the invention has been described with respect to various particular means and embodiments, it is to be understood that the invention is not limited to those means specifically disclosed but extends instead to all obvious equivalents and modifications.

Thus, the cool ambient air being fed to the cabin may undergo a single or a plurality of cooling and heating cycles prior to entering the aircraft as is deemed to be necessary.

Furthermore, although the invention has been specifically described with respect to a cooling means for cooling the air prior to its exhaust from the cabin for purposes for lowering its dew point, it is to be understood that any and all conventional means for removing moisture from the air may be used. Thus, silica gel as well as a molecular sieve may be used. Furthermore, refrigeration techniques alone or in combination with centrifugation and other means may quite obviously be used for removing the moisture from the air.

When the moisture has been removed, it is an object of the invention that this moisture be reused for purposes of humidifying fresh incoming air. Thus, means must be provided for reinjecting the removed moisture.

Such means may comprise any one of a wide variety of possible embodiments. Thus, for example, the moisture may be collected in a sump or the like and then heated for purposes of evaporating it. Alternatively, the moisture may be injected into the cabin through nozzles which finely divide the moisture thus facilitating its evaporation. Such nozzles are preferably located in the path of the incoming fresh dry air.

In an alternative embodiment of the invention, the air may be humidified by passing it through a container filled with the dehumidified water. The air used may be the bleed air taken off of the turbine of the aircraft and fed directly through the container prior to admitting the air to the cabin.

As set forth, the system may be adjusted to any desired ratio of fresh to cabin air without departing from the scope of the invention.

What is claimed is:

1. An aircraft cabin humidification system for humidifying a fresh air mass entering the cabin, said system comprising:
    (a) removal means for at least partially removing moisture from an air mass;
    (b) replacement means for at least partially replacing said air mass with fresh air, said replacement means including means for exhausting said air mass from said cabin and said aircraft and for maintaining said moisture on said aircraft; and
    (c) humidification means for humidifying said fresh air by adding at least a portion of said removed moisture to said fresh air.

2. The humidification system as defined by claim 1 wherein said removal means comprises condensation means for condensing said removed moisture.

3. The humidification system as defined by claim 2 wherein said condensation means comprises an air intake for drawing in cold ambient air and for cooling said air mass prior to the removal of said air mass so as to at least partially condense moisture out of said air mass.

4. The humidification system as defined by claim 3 wherein said condensation means further comprises a cooling coil for cooling said air mass by passing said air mass over said coil while passing coil ambient air within said coil.

5. The humidification system as defined by claim 1 wherein said removal means comprises a silica gel.

6. The humidification system as defined by claim 1 wherein said removal means comprises a molecular sieve.

7. The humidification system as defined by claim 1 wherein said removal means comprises an electrically operated refrigeration system.

8. The humidification system as defined by claim 1 wherein said humidification means comprises evaporating means for re-evaporating said removed moisture.

9. The humidification system as defined by claim 9 wherein said evaporation means comprises means for contacting heated exhaust air from the engines of said aircraft with said removed moisture for re-evaporating said removed moisture.

10. The humidification system as defined by claim 1 further comprising purification means for purifying said removed moisture.

11. A method of humidifying the cabin of an air craft comprising the steps of:
    (a) removing air from the cabin of said aircraft;
    (b) removing moisture from said removed air and exhausting said removed air with said moisture removed therefrom from said cabin and said aircraft;
    (c) replacing said removed air with fresh air; and
    (d) adding at least a portion of said removed moisture to said fresh air to humidify said fresh air and said cabin.

12. The method as defined by claim 11 further comprising purifying said removed moisture prior to adding it to said fresh air.

* * * * *